Figure 1:
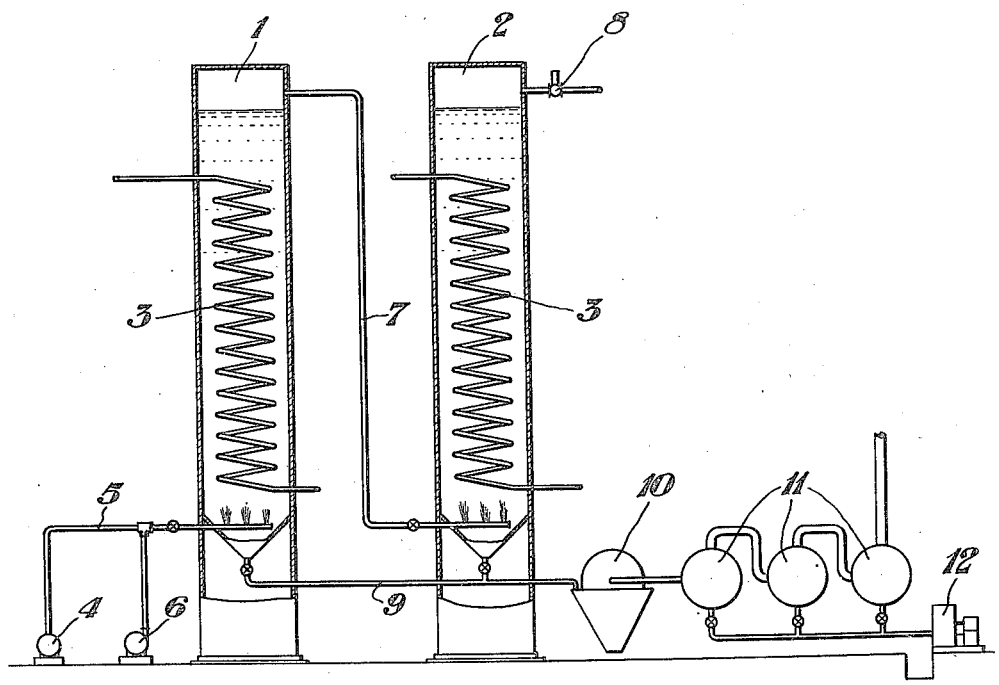

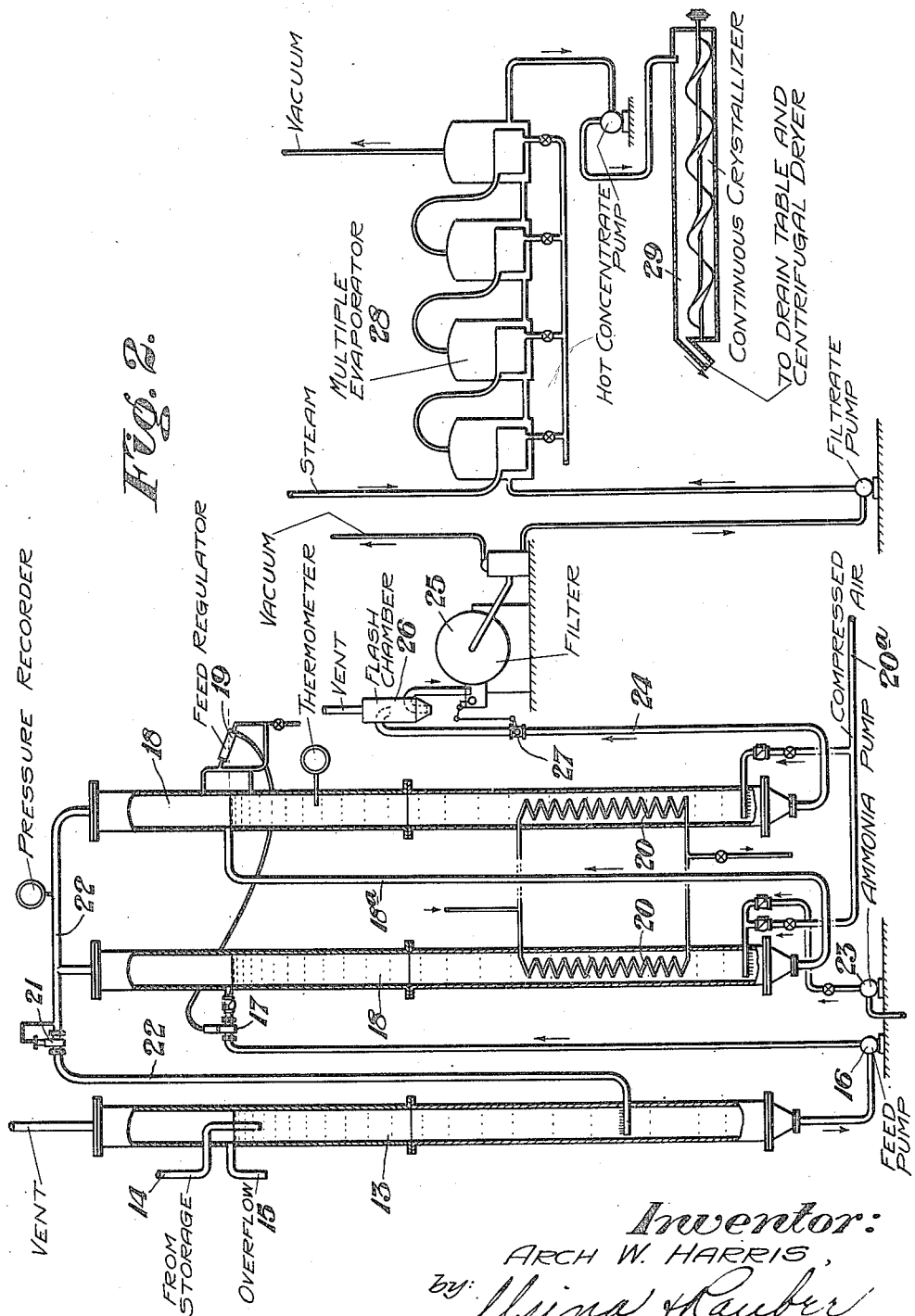

Patented Mar. 19, 1935

1,994,702

UNITED STATES PATENT OFFICE 1,994,702

UTILIZATION OF WASTE PICKLING ACIDS

Arch W. Harris, Parma, Ohio

Application February 23, 1933, Serial No. 658,156

1 Claim. (Cl. 23—200)

This invention is a method of utilizing waste pickling acids. For instance, sulphuric or hydrochloric acids are generally used for pickling and become unfit for use when the percentages of ferrous sulphate or ferrous chloride, as the case may be, substantially exceed that of the free acid content. When this condition is attained the pickling acids become waste, the present invention being intended to treat the ferrous salts which comprise the greater proportion of such waste, to produce usable iron oxides and ammonium salts.

The new method is characterized in that the waste pickling acids are treated with ammonia and oxygen so that the ammonia replaces the iron and neutralizes the solution while the oxygen causes the reaction to complete in an alkaline solution and also oxidizes the ferrous hydroxide to usable iron oxides. These reactions are carried out under sufficient heat to provide rapid formation of the resulting precipitates and speedy oxidation and dehydration of the hydrous oxides, to assure the formation of the desired iron oxides in a granular form suitable for separation by filtration. Preferably, the ammonia is recovered in salt form.

In the accompanying drawings, Figure 1 diagrammatically illustrates one specific example of the invention, and Figure 2 a modification whereby continuous operation is effected.

The waste pickling acids are placed in towers 1 and 2 and heated by steam coils 3 to around 150° centigrade. Air at a pressure of from 7 to 8 atmospheres is introduced to the bottom of the tower by an air pump 4 through a suitably arranged line 5, along with ammonia from a constant pressure pump 6. The ammonia and air rising through the tower 1 are intimately mixed with the hot waste pickling acids. The counter pressure of the air existing in the tower 1 is sufficient to prevent boiling of the acids.

The ammonia replaces the iron atom and forms ferrous hydroxide which is oxidized by the oxygen in the air. The air also partially oxidizes the ferrous salts to the ferric state so that, as the addition of it and ammonia is continued, ferri-ferrous oxides are thrown out of solution.

The process is continued until a sample of the solution shows that the iron salts have been substantially if not entirely precipitated. This may be ascertained by testing with ammonium sulphide. The addition of ammonia is then discontinued and the air continued a sufficient time to drive out all excess ammonia.

The top of the tower 1 is interconnected to the bottom of the tower 2 by a line 7 so that the gases from the first tower are introduced into the bottom of the second tower, and their loss prevented. This communication is maintained while the above reactions are being carried out so that all unused ammonia is utilized by the acid in the tower 2. This second tower is provided with a relief valve 8 constructed to maintain the desired counter pressure in the two towers to prevent boiling of the liquids.

When the precipitation in tower 1 is completed it is disconnected from tower 2 by a suitable valve and the resulting ammonium salt solution and iron oxides run through a pipe 9 to a filter 10. The filtrate is then sent to an evaporator 11 and finally to a centrifugal dryer 12 where the usable ammonium salts are dried. The desired iron oxides are, of course, obtained from the filter 10.

The tower 1 may be then refilled and the process repeated after communication has been re-established to the tower 2. The waste pickling acids in the tower 2 eventually react with the gases unused in the tower 1, and are subjected to the separation already described. It is apparent that only one tower may be used and the unused gases wasted or otherwise used, or that more towers than shown may be used to further insure the efficiency of the process.

One modification of the described method may consist in effecting continuous operation. Apparatus suitable for this purpose is illustrated by Figure 2.

This second figure shows a constant level tower 13 to which the waste pickling acids are introduced by an inlet 14. An overflow pipe 15 maintains the liquid level. A pump 16 continuously delivers the acids from this tower through a feed valve 17 to the top of the first of a pair of reaction towers 18. The acids flow from the bottom of this tower and are delivered to the top of the second tower. This is preferably gravitationally effected through a pipe 18$^a$ so that the levels in the two towers are at the same height. The valve 17 may be controlled by an automatic regulator 19 installed in either of the towers at the desired height.

Both of the towers 18 are heated by steam coils 20 to temperatures in excess of 100° centigrade, and under counter pressures sufficiently high to prevent boiling. These pressures may be maintained by compressed air which is introduced to the bottom of each tower by the pipe line 20$^a$ and held by a pressure regulator 21. This regulator is inserted in a pipe 22 which interconnects the tops of the towers 18 and is arranged to introduce gases vented therefrom to the lower portion of the tower 13. Ammonia is also introduced to the first of the towers 18 by means of a pump 23.

The treated pickling acids are withdrawn from the bottom of the second of the towers 18 and conveyed through a pipe 24 to a continuous filter 25 by way of a flash chamber 26. The level in the filter is preferably maintained by a float operated valve 27 positioned in the pipe 24. The filtrate is conveyed to a conventional evaporator 28 and from there to a crystallizer 29.

The reactions are substantially the same as previously described. That is to say, the ammonia introduced to the acids in the first of the towers 18 replaces the iron atoms and forms ferrous hydroxide which is oxidized by the oxygen in the air which is simultaneously introduced. The heat from the coil 20 dehydrates the gelatinous precipitate to granular form. The ferrous salts in the acids are also partially oxidized by the air to the ferric state, so that as the addition of the air and ammonia is continued ferri-ferrous oxides are thrown out of solution.

The air introduced to the second of the towers 18, this tower continuously receiving the liquids from the first, completes the oxidation and drives out the excess of ammonia. The vapors from the two towers are forced through the pipe 22 to the tower 13 where any unused ammonia or oxygen acts on the untreated acids.

The completely precipitated and oxidized mixture leaves the bottom of the second of the towers and the granular iron oxides separated by the continuous filter 25. The filtrate contains ammonium salts which are separated by the evaporator 28 and solidified by the continuous crystallizer 29. The ammonium salts from this crystallizer may be conveyed to a drain table or centrifugal dryer to condition them for handling.

I claim:

The method of treating waste pickling acids, which includes the steps of continuously passing them successively through a plurality of towers, subjecting them to the action of ammonia, oxygen and heat while in one of said towers, subsequently subjecting them to the action of heat and oxygen while in another of said towers, removing the vapors from said towers and subjecting the acids to the action of these vapors prior to their passage through these towers named, and finally subjecting them to filtration and evaporation.

ARCH W. HARRIS.